(12) United States Patent
Liu et al.

(10) Patent No.: US 8,680,738 B2
(45) Date of Patent: Mar. 25, 2014

(54) UNIVERSAL MOTOR WITH AUXILIARY MAGNETIC POLES

(75) Inventors: Bao Ting Liu, Shenzhen (CN); Ji Dong Chai, Shenzhen (CN); Ji Cheng Pan, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 426 days.

(21) Appl. No.: 12/644,987

(22) Filed: Dec. 22, 2009

(65) Prior Publication Data

US 2010/0156229 A1    Jun. 24, 2010

(30) Foreign Application Priority Data

Dec. 24, 2008  (CN) .......................... 2008 1 0241666
Jun. 1, 2009   (CN) .......................... 2009 1 0148933

(51) Int. Cl.
*H02K 1/16*   (2006.01)
*H02K 1/14*   (2006.01)

(52) U.S. Cl.
USPC ................................ 310/216.071; 310/254.1

(58) Field of Classification Search
USPC ......... 310/216.071, 216.069–216.074, 254.1, 310/158, 184–186
IPC .................. H02K 1/06,1/12, 1/14, 1/16, 23/00, H02K 23/22, 23/24, 23/36, 23/46, 23/64
See application file for complete search history.

(56) References Cited

U.S. PATENT DOCUMENTS

| 3,909,647 | A | * | 9/1975 | Peterson ................ 310/216.073 |
| 3,942,055 | A | * | 3/1976 | Hoffmeyer ............. 310/216.071 |
| 4,241,274 | A | * | 12/1980 | Brammerlo ............ 310/216.071 |
| 4,698,539 | A |   | 10/1987 | Workman |
| 5,045,742 | A | * | 9/1991 | Armstrong et al. .... 310/216.069 |
| 5,223,761 | A | * | 6/1993 | Larsen ................... 310/216.059 |
| 7,230,361 | B2 | * | 6/2007 | Hirzel .................... 310/216.074 |
| 2009/0108702 | A1 | * | 4/2009 | Mock ........................... 310/259 |

* cited by examiner

*Primary Examiner* — Burton Mullins
*Assistant Examiner* — Michael Andrews
(74) *Attorney, Agent, or Firm* — Muncy, Geissler, Olds & Lowe, P.C.

(57) ABSTRACT

A universal motor includes a stator and a rotor rotatably installed in the stator. The stator includes a stator core having a yoke, n primary poles with windings wound thereon and n auxiliary poles. The primary poles and auxiliary poles are alternately arranged on the radially inner side of the yoke in a circumferential direction thereof. When the windings are electrified, n primary magnetic poles and n auxiliary magnetic poles are formed at the primary poles and auxiliary poles respectively, n being an integer greater than 1. All the primary magnetic poles have the same polarity and the polarity of each auxiliary magnetic poles is opposite the polarity of the primary magnetic poles.

15 Claims, 4 Drawing Sheets

UNIVERSAL MOTOR WITH AUXILIARY MAGNETIC POLES

CROSS REFERENCE TO RELATED APPLICATIONS

This non-provisional patent application claims priority under 35 U.S.C. §119(a) from Patent Application No. 200810241666.0 filed in The People's Republic of China on Dec. 24, 2008 and Patent Application No. 200910148933.4 filed in The People's Republic of China on Jun. 1, 2009.

FIELD OF THE INVENTION

This invention relates to a universal motor and in particular, to a stator for a universal motor.

BACKGROUND OF THE INVENTION

FIGS. 5 and 6 show a typical known universal motor. FIG. 5 is a cross sectional view showing the stator core, stator windings and rotor (rotor windings omitted) while FIG. 6 is a similar view without the stator windings but with lines indicating the magnetic flux path through the motor. The motor comprises a stator core which comprises a yoke with a rectangular configuration and two salient poles extending inwardly from two opposing sides of the yoke. Two coils, forming the stator windings, are wound on the poles. When the coils are electrified, the two poles form two magnetic poles with opposite polarity and two flux paths are formed. Each flux path passes through the two poles, across the rotor, and one half of the yoke. Thus, the two stator coils only form two magnetic poles, one for each coil, and each flux path is relatively long.

SUMMARY OF THE INVENTION

Hence there is a desire for an improved universal motor.

Accordingly, in one aspect thereof, the present invention provides a universal motor comprising: a stator and a rotor rotatably installed in the stator, wherein the stator comprises a stator core having a yoke, n primary poles with windings wound thereon and n auxiliary poles, the primary poles and auxiliary poles being alternately arranged at the radially inner side of the yoke in a circumferential direction thereof; and wherein when the windings are electrified, n primary magnetic poles and n auxiliary magnetic poles are formed at the primary poles and auxiliary poles respectively, each primary magnetic pole has the same polarity and each auxiliary magnetic pole has the same polarity which is opposite the polarity of the primary magnetic poles, n being an integer greater than 1.

Preferably, the ratio of the outer diameter D of the rotor core to the minimum outer diameter Y of the stator core, D/Y, is greater than 0.7.

Preferably, the auxiliary poles are without windings wound thereon and the auxiliary magnetic poles are induced magnetic poles.

Preferably, the yoke comprises first sections from which the primary poles extend, and second sections from which the auxiliary poles extend, the first sections being narrower than the second sections.

Preferably, mounting holes are formed in the second sections.

Preferably, wherein the primary poles and the auxiliary poles are salient poles projecting inwardly from the yoke, each pole comprises a neck inwardly extending from the yoke and a pole shoe extending from the neck, the distance between the yoke and the pole shoes of the primary poles are greater than the distance between the yoke and the pole shoes of the auxiliary poles.

Preferably, additional windings are wound on the auxiliary poles, the number of turns of the additional windings being less than that of the windings wound on the primary poles.

Preferably, n is equal to 2, 3, or 4.

Preferably, the radial gap between the primary poles and the rotor core is equal to the radial gap between the auxiliary poles and the rotor core.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

A universal motor according to the present invention comprises a stator and a rotor rotatably mounted with respect to the stator. The stator comprises a stator core and stator windings wound on the stator core. The stator core comprises a yoke, n primary poles with coils of the stator windings wound thereon and n auxiliary poles, the primary poles and auxiliary poles being alternately arranged at the inner side of the yoke in a circumferential direction thereof. When the coils wound on the primary poles are electrified, n primary magnetic poles and n auxiliary magnetic poles are respectively formed at the primary poles and auxiliary poles. The polarity of the primary magnetic poles are all the same and is reverse to the polarity of the auxiliary magnetic poles.

Figure 1:
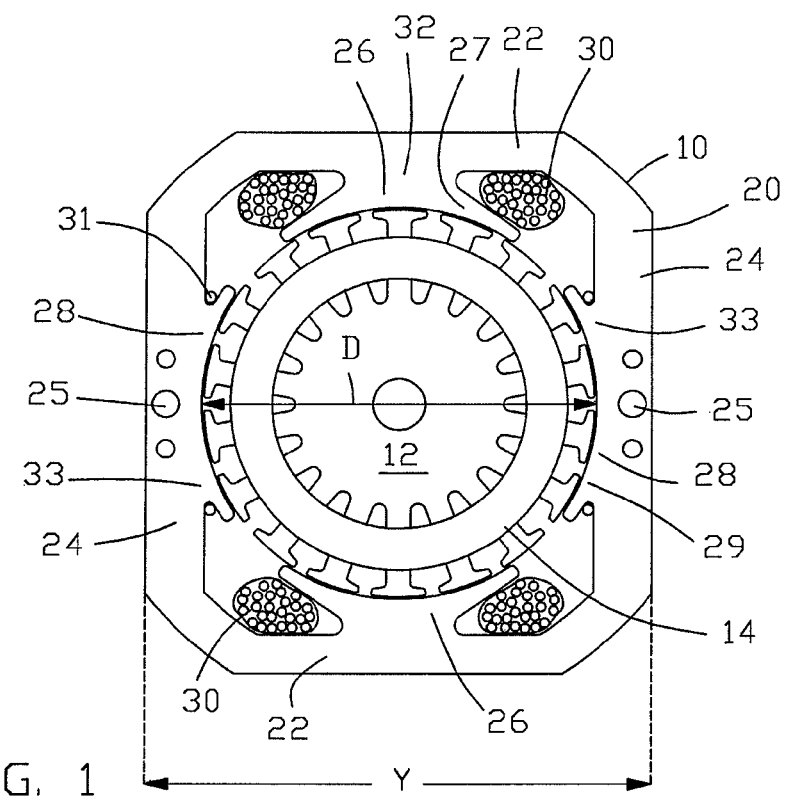
FIG. 1 is a sectional plan view of a universal motor in accordance with a preferred embodiment of the present invention.
Figure 2:
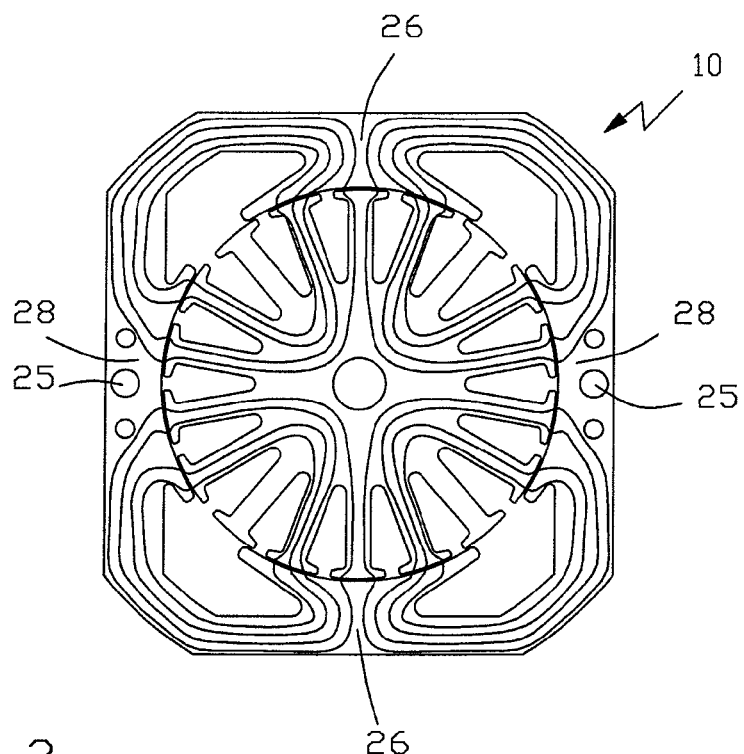
FIG. 2 is a sketch showing the flux path of the motor of FIG. 1.
Figure 1A:
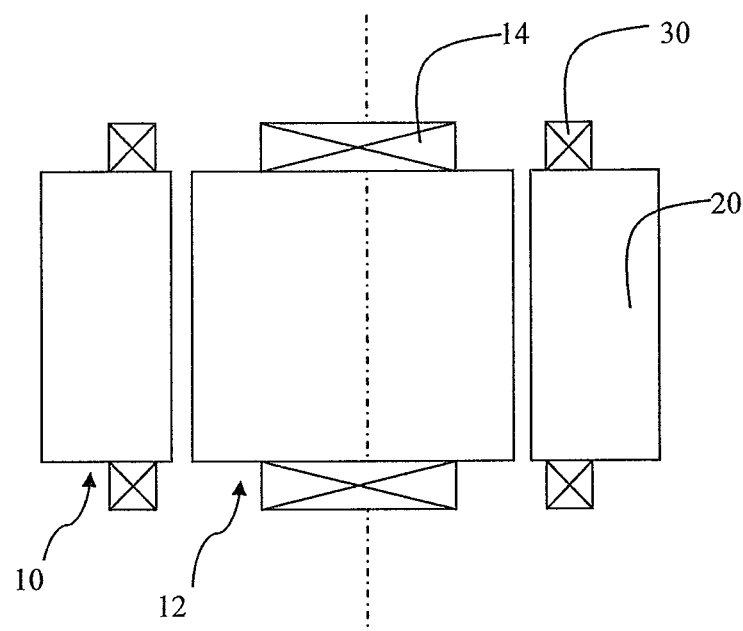
FIG. 1A illustrates the rotor with rotor winding wound on the rotor core thereof and the stator with the stator winding wound on the stator core thereof.

FIGS. 1, 1A and 2 show a single phase 4-pole universal motor according to a first preferred embodiment of the present invention. The motor comprises a stator 10 and a rotor 12. FIG. 1 is a sectional view showing a stator core 20, stator windings and the rotor with rotor windings 14 omitted, FIG. 1A illustrates the rotor 12 with rotor winding 14 wound on the rotor core thereof and the stator 10 with the stator winding 30 wound on the stator core 20 thereof, while FIG. 2 is a similar view with the stator windings and rotor windings omitted and lines indicating the magnetic flux path through the motor.

The stator 10 comprises the stator core 20 and stator windings formed by coils 30. The stator core 20 is formed by stacking together a plurality of laminations stamped from sheet electrical steel. The stator core 20 comprises a yoke which comprises two first sections 22 and two second sections 24, alternately arranged in a circumferential direction of the yoke. The stator core 20 further comprises two primary poles 26 respectively extending from the two first sections 22, and two auxiliary poles 28 respectively extending from the two second sections 24. The primary poles 26 and auxiliary poles 28 surround the rotor 12. The coils 30 are wound on the primary poles 26. The auxiliary poles 28 have no coils wound thereon. The second sections 24 may have mounting holes, as shown.

Referring to FIG. 2, when the coils 30 wound on the primary poles 26 are electrified, two primary magnetic poles are formed at the primary poles 26 respectively. The polarity of both primary magnetic poles are the same. Two magnetic paths are formed at each primary pole 26, the corresponding portions of the stator core, the adjacent auxiliary pole, and the corresponding portions of the rotor. Two induced magnetic poles are formed respectively at the auxiliary poles. The polarity of the auxiliary magnetic poles is opposite the polarity of the primary magnetic poles, for example, when the primary poles are forming North magnetic poles the auxiliary poles are forming South magnetic poles. Thus the stator 10 forms four magnetic poles and four magnetic circuits. Each magnetic circuit only passes through half of two sides of the yoke of the stator core 20 or one quarter of the yoke. Thus the length of each magnetic circuit is reduced compared to a motor having only two primary poles.

In the preferred embodiment as shown in FIG. 1, all the poles 26, 28 are salient poles and each pole comprises a neck extending radially inwardly from the yoke, and a pole shoe extending from the neck. That is the primary poles 26 have a pole shoe 27 connected to the first section 22 of the yoke by a neck 32 and the auxiliary poles 28 have a poles shoe connected to the second section 24 of the yoke by a neck 33. The pole shoes cooperatively form a discontinuous curved surface surrounding and facing the rotor 12. In the circumferential direction, the necks 32 of the primary poles 26 are narrower than the necks 33 of the auxiliary poles 28. Optionally, in the radial direction, the first sections 22 of the yoke are narrower than the second sections 24 of the yoke, and the distance between the first sections 22 and the circumferential edges of the pole shoes 27 of the primary poles 26 are greater than the distance between the second sections 24 and the circumferential edges of the pole shoes 29 of the auxiliary poles 28. In this manner, a greater space is formed between the first sections 22 and the primary poles 26, for accommodating the coils 30 of the stator windings. Preferably, holes 25 are formed in the wider second sections 24 for mounting of end brackets which support bearings and brush gear (not shown) of the motor. In this manner, the mounting holes do not have an adverse effect on the magnetic path of the yoke.

In the present invention, the radial direction and the circumferential direction are not limited to a yoke having a circular or cylindrical configuration. For example, the cross-section of stator core of the present invention may be square-shaped, rectangular-shaped, or other non-circular-shaped.

Referring back to FIG. 1, the rotor 12 has an outer diameter D. The stator 10 has a minimum outer diameter Y. Preferably, the ratio of the outer diameter D and the minimum outer dimension Y, D/Y, is greater than 0.7. The outer diameter of the rotor 12 means the outer diameter of the rotor core. The minimum outer diameter of the stator 10 means the length of a line between two points the periphery of the stator core 20 passing through the axial center of the stator 10. The outer diameter of the rotor 12 is slightly less than the inner diameter of a cylinder formed by the curved surfaces of the pole shoes of the poles 26, 28 as that the rotor core faces the poles across a small air gap. Therefore, the ratio of the inner diameter of the circle to the outer diameter of the rotor 12, D:Y, being greater than 7:10, means that the torque produced by the motor is high for a stator core of a predetermined size as the torque of the motor is related to the diameter of the rotor.

Understandably, the radial gap between the primary poles and the rotor core may be equal to the radial gap between the auxiliary poles and the rotor core. Alternatively, the radial gap between the primary poles and the rotor core may not be equal to the radial gap between the auxiliary poles and the rotor core.

The auxiliary magnetic poles of the above embodiment of the present invention are formed at the auxiliary poles 28 which project inwardly from the inner side of the second yoke 24. Thus, the auxiliary magnetic poles are salient poles. Alternatively, the auxiliary magnetic poles may be non-salient poles which are sunk relative to the inner side of the second section 24 of the yoke. When the auxiliary poles are salient poles, auxiliary coils 31 with fewer turns than the coils 30 may be wound on the auxiliary poles.

In the present invention, each flux circuit passes through a primary magnetic pole and an adjacent auxiliary magnetic pole. The length of the flux path is reduced and optimized. Thus, the universal motor of the present invention needs less stator core material compared with known universal motors with the same output, thereby saving on material costs.

Figure 3:
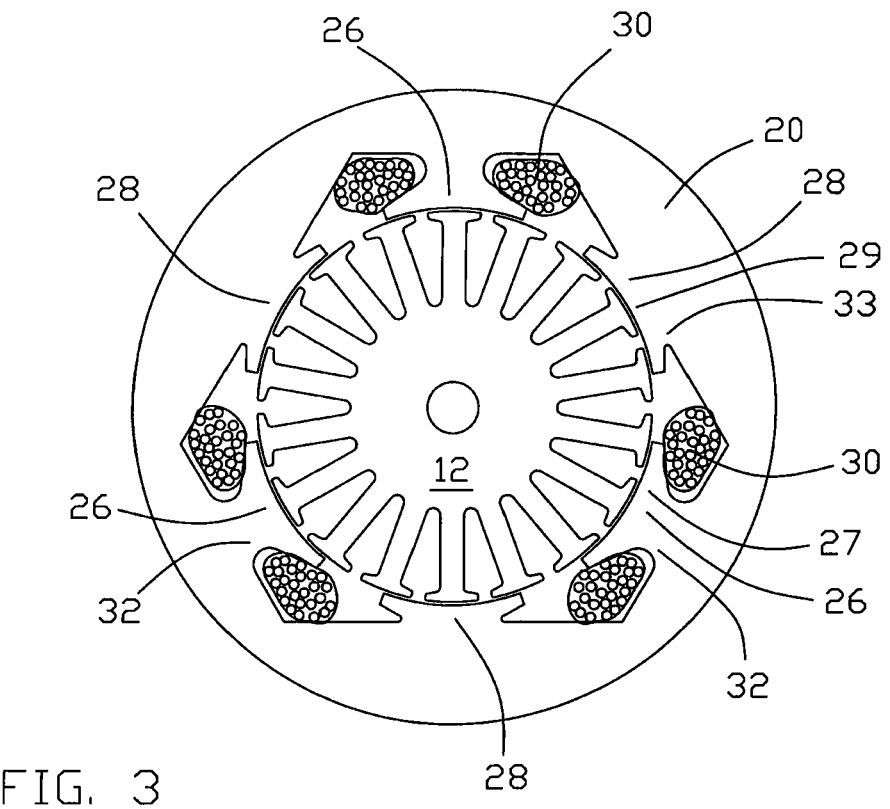
FIG. 3 is a sectional plan view of a universal motor in accordance with a second embodiment of the present invention.
Figure 4:
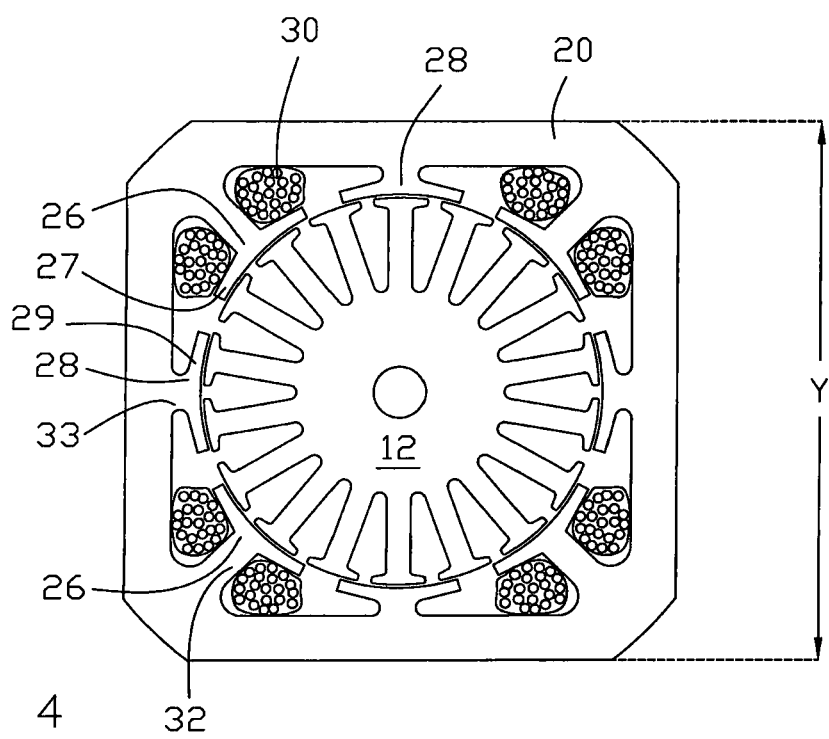
FIG. 4 is a sectional plan view of a universal motor in accordance with a third embodiment of the present invention.
Figure 5:
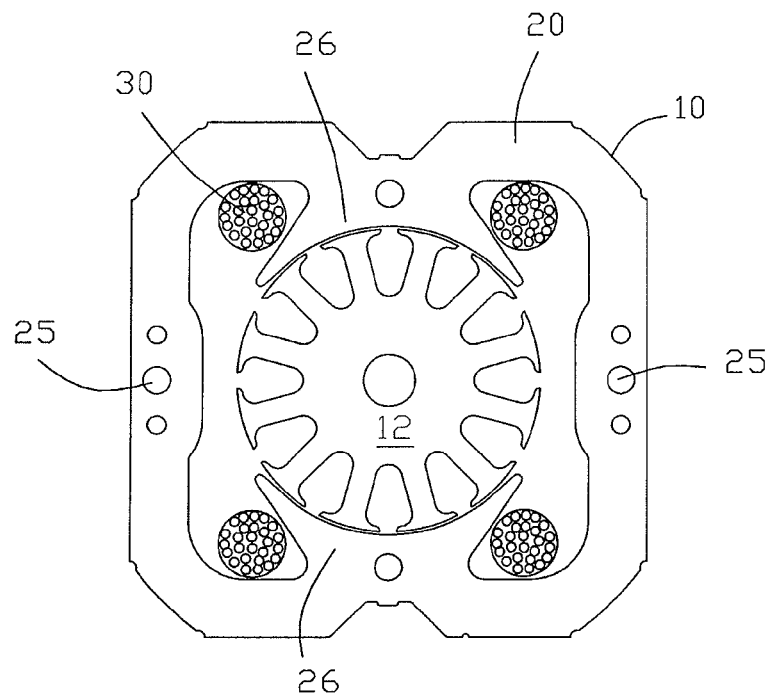
FIG. 5 is a sectional plan view of a conventional universal motor.
Figure 6:
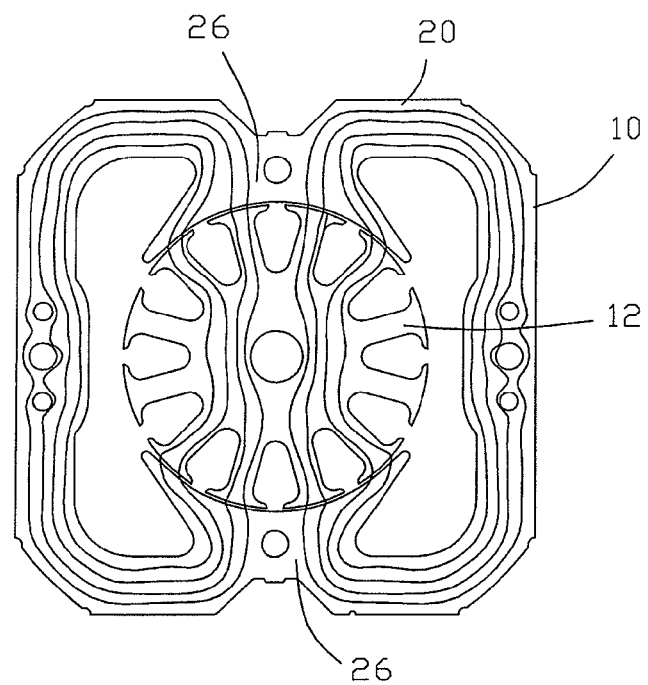
FIG. 6 is a sketch showing the flux path of the motor of FIG. 5.

According to alternative embodiments, the universal motor of the present invention may use windings having three coils to form six magnetic poles as shown in FIG. 3, four coils to form eight magnetic poles as shown in FIG. 4, or n coils to form 2n magnetic poles, n being an integer greater than 1.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A universal motor comprising:
a stator and a rotor rotatably installed in the stator,
wherein the rotor comprises a rotor core and rotor windings wound on the rotor core, wherein the stator comprises a stator core having a yoke, n primary poles with windings wound thereon and n auxiliary poles, the primary poles and auxiliary poles being alternately arranged at the radially inner side of the yoke in a circumferential direction thereof, the auxiliary poles being without windings wound thereon or with additional windings wound thereon, the number of turns of the additional windings being less than that of the windings wound on the primary poles; and
wherein when the windings are electrified, n primary magnetic poles and n auxiliary magnetic poles are formed at the primary poles and auxiliary poles respectively and 2n magnetic circuits are formed, each primary magnetic pole has the same polarity and each auxiliary magnetic pole has the same polarity which is opposite the polarity of the primary magnetic poles, n being an integer greater than 1, each of the magnetic circuits passing through a primary magnetic pole and an adjacent auxiliary magnetic pole and corresponding portions of the rotor and yoke such that the length of the magnetic circuit is reduced and the torque produced by the motor is increased.

2. A universal motor comprising:
a stator and a rotor rotatably installed in the stator,
wherein the rotor comprises a rotor core and rotor windings wound on the rotor core, wherein the stator comprises a stator core having a yoke, n primary poles with windings wound thereon and n auxiliary poles, the primary poles and auxiliary poles being alternately arranged at the radially inner side of the yoke in a circumferential direction thereof;
wherein when the windings are electrified, n primary magnetic poles and n auxiliary magnetic poles are formed at the primary poles and auxiliary poles respectively and 2n magnetic circuits are formed, each primary magnetic pole has the same polarity and each auxiliary magnetic pole has the same polarity which is opposite the polarity of the primary magnetic poles, n being an integer greater than 1, each of the magnetic circuits passing through a primary magnetic pole and an adjacent auxiliary magnetic pole and corresponding portions of the rotor and yoke such that the length of the magnetic circuit is reduced and the torque produced by the motor is increased; and
wherein the ratio of the outer diameter D of the rotor to the minimum outer diameter Y of the stator core D/Y is greater than 0.7.

3. The universal motor of claim 1, wherein the auxiliary poles are without windings wound thereon and the auxiliary magnetic poles are induced magnetic poles.

4. The universal motor of claim 1, wherein the yoke comprises first sections from which the primary poles extend, and second sections from which the auxiliary poles extend, the first sections being narrower than the second sections in radial directions of the yoke.

5. The universal motor of claim 4, wherein mounting holes are formed in the second sections.

6. The universal motor of claim 1, wherein the primary poles and the auxiliary poles are salient poles projecting inwardly from the yoke, each pole comprises a neck inwardly extending from the yoke and a pole shoe extending from the neck, the distance between the yoke and the pole shoes of the primary poles is greater than the distance between the yoke and the pole shoes of the auxiliary poles.

7. The universal motor of claim 6, wherein additional windings are wound on the auxiliary poles, the number of turns of the additional windings being less than that of the windings wound on the primary poles.

8. The universal motor of claim 6, wherein in the circumferential direction, the necks of the primary poles are narrower than the necks of the auxiliary poles.

9. The universal motor of claim 1, wherein n is equal to 2, 3, or 4.

10. The universal motor of claim 1, wherein the radial gap between the primary poles and the rotor core is equal to the radial gap between the auxiliary poles and the rotor core.

11. The universal motor of claim 1, wherein the cross section of the stator core has a rectangular shape.

12. The universal motor of claim 11, wherein the ratio of the outer diameter D of the rotor to the length of a line between two points of the periphery of the stator core passing through the axial center of the stator and the auxiliary poles is greater than 0.7.

13. A universal motor comprising:
a stator and a rotor rotatably installed in the stator,
wherein the rotor comprises a rotor core and rotor windings wound on the rotor core,
wherein the stator comprises a stator core having a yoke, n primary poles each with a single coil wound thereon and n auxiliary poles, the primary poles and auxiliary poles being alternately arranged at the radially inner side of the yoke in a circumferential direction thereof, each coil only wound on a single pole, each auxiliary pole being without coil wound thereon or with an additional coil wound thereon, the number of turns of the additional coil being less than that of the coil wound on the primary pole,
wherein when the windings are electrified, n primary magnetic poles and n auxiliary magnetic poles are formed at the primary poles and auxiliary poles respectively, each primary magnetic pole has the same polarity and each auxiliary magnetic pole has the same polarity which is opposite the polarity of the primary magnetic poles, n being an integer greater than 1, every two adjacent primary magnetic pole and auxiliary magnetic pole forming a magnetic circuit passing through portions of the rotor to cause the rotor to rotate; and
wherein the primary poles and the auxiliary poles are salient poles projecting inwardly from the yoke, each pole comprises a neck inwardly extending from the yoke and a pole shoe extending from the neck, the distance between the yoke and the pole shoes of the primary poles is greater than the distance between the yoke and the pole shoes of the auxiliary poles.

14. The universal motor of claim 13, wherein in the circumferential direction the necks of the primary poles are narrower than the necks of the auxiliary poles.

15. A universal motor comprising:
a stator and a rotor rotatably installed in the stator,
wherein the rotor comprises a rotor core and rotor windings wound on the rotor core,
wherein the stator comprises a stator core having a yoke, n primary poles each with a single coil wound thereon and n auxiliary poles, the primary poles and auxiliary poles being alternately arranged at the radially inner side of the yoke in a circumferential direction thereof, each coil only wound on a single pole,
wherein when the windings are electrified, n primary magnetic poles and n auxiliary magnetic poles are formed at the primary poles and auxiliary poles respectively, each primary magnetic pole has the same polarity and each auxiliary magnetic pole has the same polarity which is opposite the polarity of the primary magnetic poles, n being an integer greater than 1, every two adjacent primary magnetic pole and auxiliary magnetic pole forming a magnetic circuit passing through portions of the rotor to cause the rotor to rotate;
wherein the primary poles and the auxiliary poles are salient poles projecting inwardly from the yoke, each pole comprises a neck inwardly extending from the yoke and a pole shoe extending from the neck, the distance between the yoke and the pole shoes of the primary poles is greater than the distance between the yoke and the pole shoes of the auxiliary poles;
wherein the cross section of the stator core has a rectangular shape, and the ratio of the outer diameter D of the rotor to the length of a line between two points of the periphery of the stator core passing through the axial center of the stator and the auxiliary poles is greater than 0.7.

* * * * *